United States Patent [19]

McAllister et al.

[11] 4,422,797
[45] Dec. 27, 1983

[54] FIRE RESISTANT OIL SPILL CONTROL BOOM

[76] Inventors: Ian R. McAllister; Ian A. Buist; William M. Pistruzak, all of P.O. Box 200, Calgary, Alberta, Canada, T2P 2H8

[21] Appl. No.: 348,877

[22] Filed: Feb. 16, 1982

[51] Int. Cl.³ ............................................. E02B 15/04
[52] U.S. Cl. .................................... 405/70; 405/63
[58] Field of Search ................................ 405/63–72, 405/60; 210/922, 923

[56] References Cited

U.S. PATENT DOCUMENTS

| | | | |
|---|---|---|---|
| 3,645,099 | 2/1972 | Saavedra | 405/70 |
| 3,751,925 | 8/1973 | Thurman | 405/63 X |
| 3,906,732 | 9/1975 | Tedeschi | 405/70 X |
| 3,924,412 | 12/1975 | Bennett et al. | 405/70 X |
| 4,174,186 | 11/1979 | Kasai et al. | 405/63 X |

FOREIGN PATENT DOCUMENTS

| | | | |
|---|---|---|---|
| 637856 | 5/1936 | Fed. Rep. of Germany | 405/70 |
| 2433079 | 4/1980 | France | 405/63 |

*Primary Examiner*—Dennis L. Taylor

[57] ABSTRACT

A fire resistant spillage containment boom comprising a plurality of units connected together, each of the units comprising a float member and panels extending vertically above and below the float member, a corrugated panel having vertically disposed corrugation secured to one end of the float member, and a connecting means on the other hand of the corrugated panel and on the other end of the float member, and a connecting member for securing the adjacent units together.

15 Claims, 12 Drawing Figures

FIRE RESISTANT OIL SPILL CONTROL BOOM

This invention relates to a fire resistant oil spill control boom. More particularly, this invention relates to an improved oil spill control boom capable of withstanding high temperatures and high stresses normally encountered in water conditions prevalent at sea.

BACKGROUND OF THE INVENTION

In recent years, high volume shipments of crude oil and petroleum products by vessels and barges at sea has become an increasingly important mode of transportation of such products. However, with increasing shipments, and large vessels, as well as offshore drilling rigs and the like, the possibility of environmental damage caused by spillage of such products has become increasingly important.

One method for controlling the spills has been to encircle the resulting "oil slick" with a floating containment boom. Such a boom is towed by boat to the site of the oil spill, and the boat with the boom in tow then encircles the spill in order to restrict the spread thereof.

However, such containment booms of early design were met with a number of problems which were only encountered after use. For example, the tremendous force exerted on the booms by the wave action could easily break apart many of the prior art booms. Of course, when this occurs, the violent wave action rapidly spreads the oil slick. However, even if the boom had sufficient strength to withstand the wave action, another problem would quite often arise, namely the possibility of fire. Because of the highly volatile nature of many of the spilled petroleum products, fire is an ever present concern, since any such fire could damage the towing vessel or any nearby shore or harbor structures. If the boom were destroyed by the fire itself, then as the oil slick would spread, so would the fire in an uncontrollable fashion. Further, if the fire were to damage the containment boom, spread of the fire to adjacent structures would also occur.

Prior art containment booms are typified by U.S. Pat. Nos. 3,638,430; 3,673,804; 3,731,491; 3,924,412; 3,973,406; 3,998,060; 4,062,191; and 4,190,381. However, these devices all tend to suffer from one or more of the disadvantages mentioned above.

Accordingly, it is a primary object of the present invention to provide an improved containment boom.

Another object of the present invention is to provide a containment boom which is sufficiently flexible as to be wave compliant.

Another object of this invention is to provide a containment boom which, while being wave compliant, retains sufficient strength to withstand the forces to which it is subjected by wave action.

Still another object of this invention is to provide a fire resistant or fireproof containment boom.

Yet a further object of this invention is to provide a containment boom of high strength, flexibility, and fire resistancy.

Yet a further object of this invention is to provide a containment boom which may be readily adjusted to the length needed.

These and other objects and advantages of this invention will become apparent when considered in light of the following description and claims when taken together with the accompanying drawings in which:

DESCRIPTION OF THE INVENTION

Figure 1:
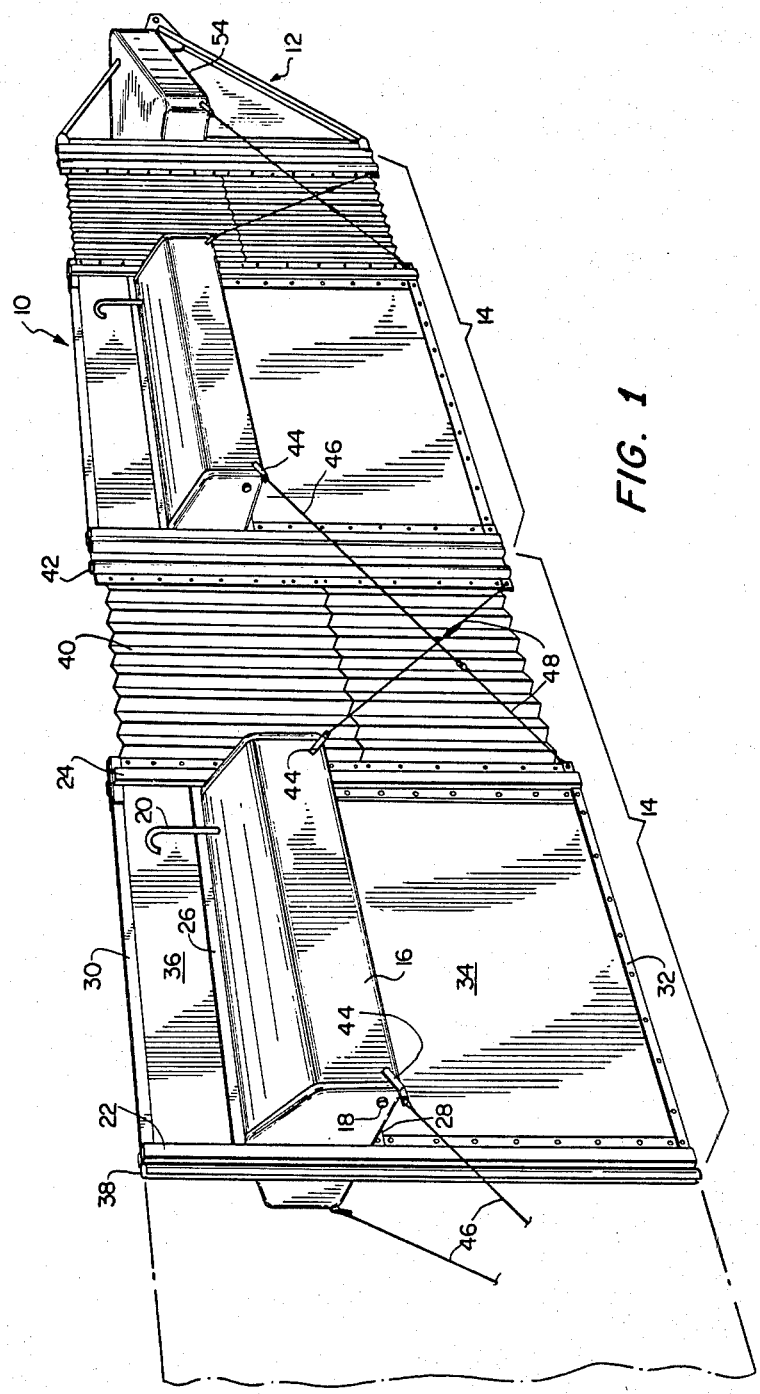
FIG. 1 is a perspective view showing a portion of the containment boom according to the present invention.
Figure 2:
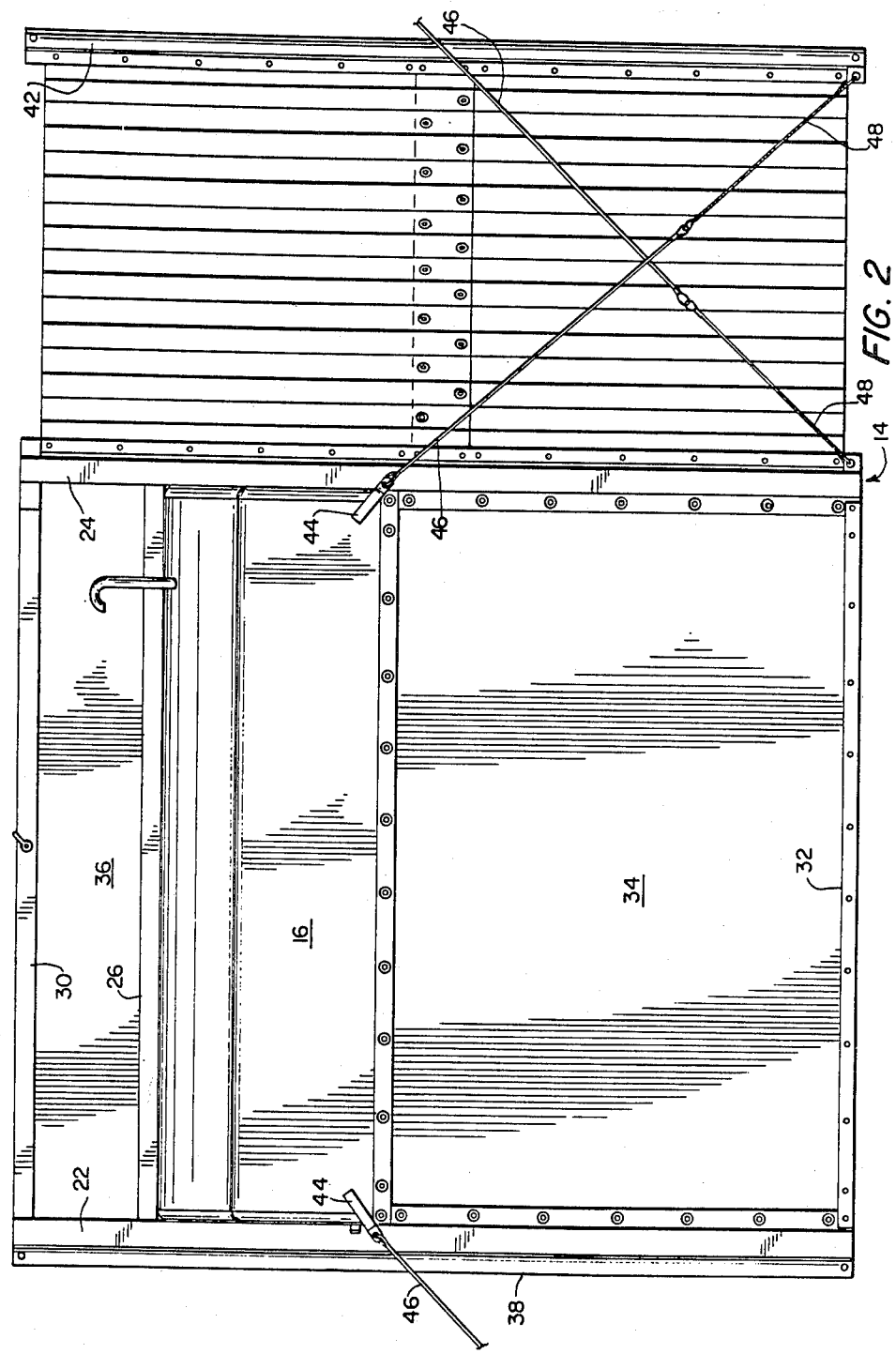
FIG. 2 is a plan view of one repeating unit of the containment boom according to the present invention.
Figure 3:
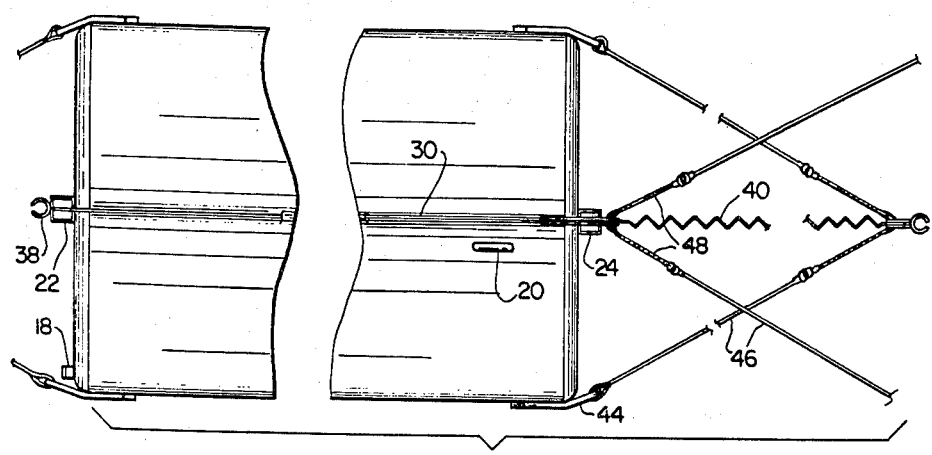
FIG. 3 is a top plan view of the structure of FIG. 2.
Figure 4:
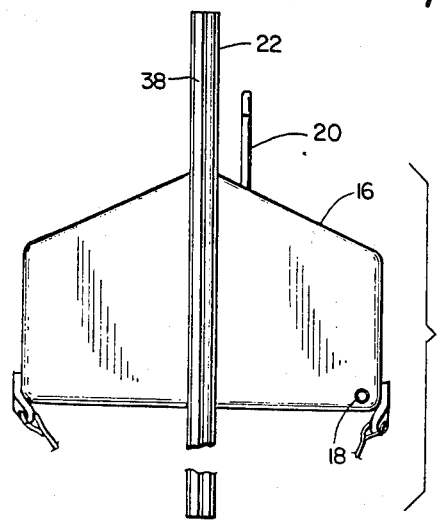
FIG. 4 is an end view of the structure of FIG. 2.

Referring initially to FIGS. 1–4, the containment boom according to the present invention is generally designated 10 and is seen to include a leading unit 12 and a plurality of units 14. Each of the units 14 is of the same construction, and as many units as may be necessary may be connected together to form a boom of the desired length. Each of the sections 14 includes a float chamber 16. The float chamber 16 is a sealed chamber made of a suitable fire resistant metal, for example, stainless steel. The float chamber 16 may be provided with a drain plug 18 and is also provided with a vent pipe 20 which, because of its inverted "J" configuration, will allow the release of pressure caused by heat from a fire, but will also prevent the inflow of sea water. The drain plug 18 may be used to release any condensation or other moisture which might enter the float chamber 16.

Attached to each end of the float chamber 16 are vertical frame sections 22 and 24. The frame sections 22 and 24 are also of a suitable, fire resistant metal such as stainless steel, and may be attached to the float chamber 16 by any suitable means such as, for example, welding. Along the top and bottom of the float chamber 16 are additional frame segments 26 and 28 likewise suitably attached, and also made of metal such as stainless steel. Further frame sections 30 and 32 connect to the vertical sections 22 and 24 as shown.

Depending from the float chamber 16 and secured to the frame sections 22, 24, 28 and 32 is a sheet metal panel or skirt 34. Skirt 34 is attached to the frame sections 22, 24, 28 and 32 by suitable fasteners such as rivets. The skirt 34 need not be so thick so as to be rigid, since it is strengthened considerably by the frame sections to which it is attached.

Similarly, a metal panel 36 is attached to the frame sections 22, 24, 26 and 30 above the float chamber 16, and serves to provide additional freeboard for the boom.

Formed integrally with or rigidly secured to the frame section 22 is an open C-shaped channel member 38 which is coextensive with the full length of the frame section 22. The channel 38 forms a part of the connection between adjacent sections 14 as will be described below.

Attached to the frame section 24 is a corrugated sheet of metal such as stainless steel 40, attached so that the corrugations extend vertically as shown. At the distal end of panel 40 is provided a vertically extending C-shaped section 42, similar to section 38, but oppositely directed.

Each of the float chambers 16 has attached thereto at each corner thereof a bracket or strap 44. These brackets may be attached to the float chamber as by welding, for example. Attached to each of the brackets is a cable 46. Attached to the lower end of the cable 46 is a suitable elastic cord 48 such as, for example, a shock cord or the like. The shock cord in turn is attached at its other end to the lowermost corner of the corrugated panel 40, as seen in the drawings. Each of the four brackets 44 is similarly connected to the lower, diagonally opposite corner of the flexible panel 40 adjacent thereto as illustrated. In this manner, a shock absorbing system is formed which also limits the extension of the corrugated panel 40. Of course, the cables 46 and the straps could be replaced by a single cable which would still provide, together with the extensibility of the panel 40, a degree of shock absorption, but with enhanced strength.

Figure 5:
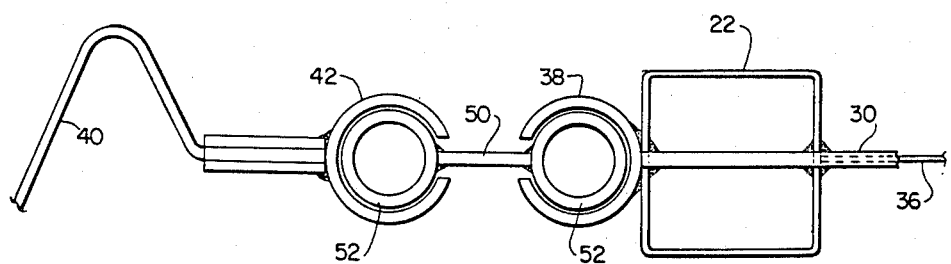
FIG. 5 is a top plan view of the connecting structure for adjacent boom sections.
Figure 6:
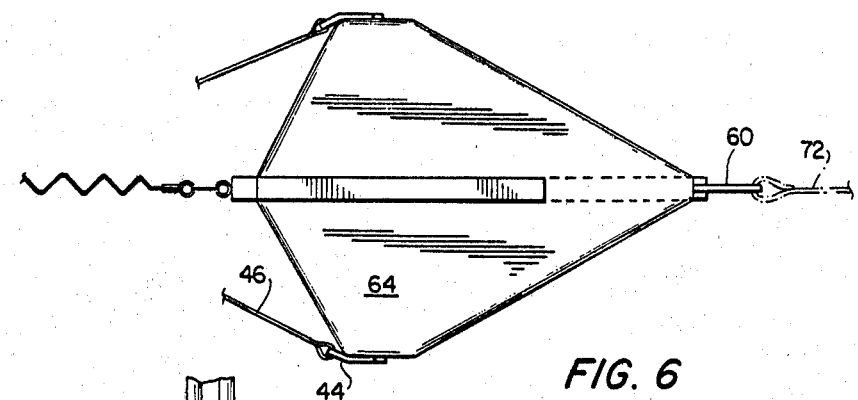
FIG. 6 is a top plan view of the leading section of the containment boom.
Figure 7:
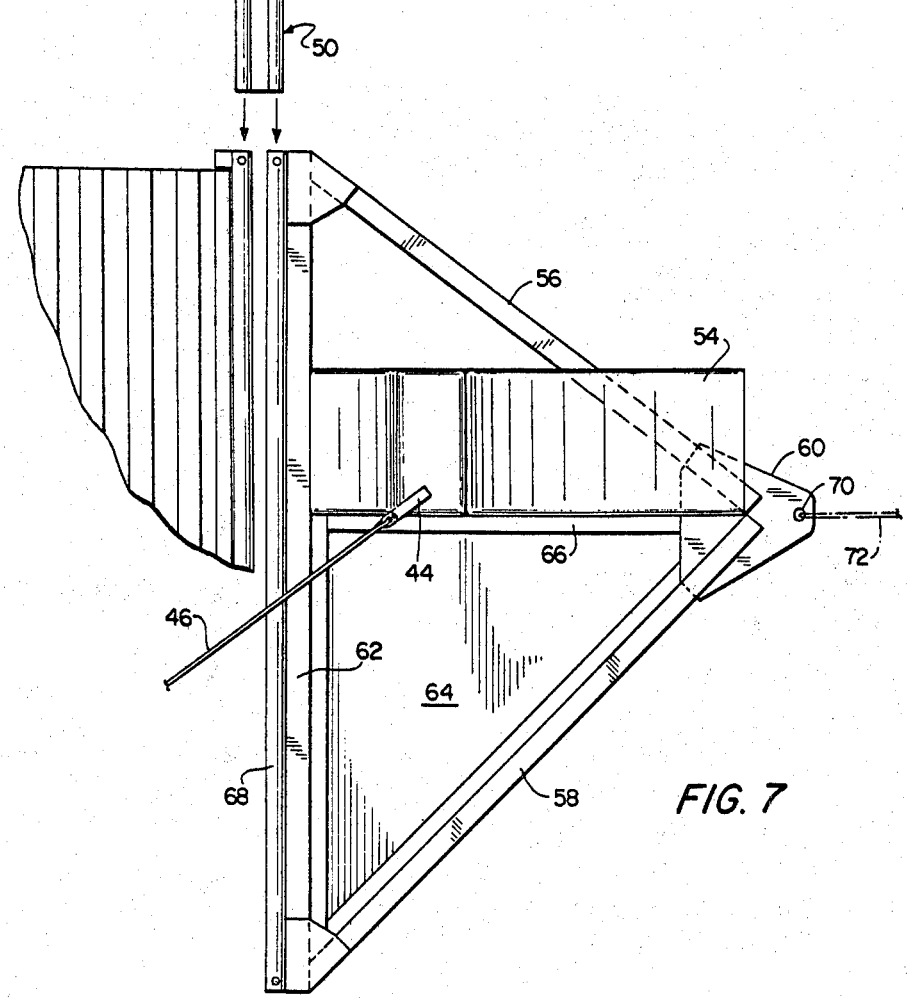
FIG. 7 is a side elevation view of the leading section of FIG. 6.

Adjacent units 14 are connected by a dumbbell-shaped connecting member 50 best seen in FIG. 5. The connecting member 50 is provided with two enlarged circular sections adapted to engage respectively the C-shaped sections 38 and 42 of adjacent units 14. The members 50 and the sections 38 and 42 are so sized as to provide a snug fit which will retain the adjacent sections 14 in connected relationship without the possibility that they would come separated.

In the construction described thus far, it is seen that the skirt 34 extends below the float a distance of at least about twice the height of the float. In addition, the panel 36 extends above the float a distance at least about two-thirds of the height of the float. In this manner, the skirt provides sufficient stability to the boom in the water, and the panel 36 provides sufficient additional freeboard to contain both the floating petroleum as well as any flames which might rise above the surface of the liquid. Similarly, the rigidity of the panels 34 and 36 and the float 16 is offset by the flexibility of the panel 40, thus enabling the entire boom to comply with the wave action without unduly stressing the boom.

The construction is, therefore, quite stable and sturdy in the commonly encountered wave action, but has sufficient residual stress to withstand the action of storms and the like which might be encountered.

As indicated, in use, the boom is towed into place by a boat or similar vessel. In order to maintain stability of the boom during towing, a leading section 12 is provided and includes a generally triangular, horizontally disposed float 54 similarly formed of metal such as stainless steel. The float 54 is attached to the frame which consists of sections 56 and 58 connected to the shackle 60 at one end, and the sections 56 and 58 being connected at their other end to opposite ends of a frame member 62. A metal panel 64 is secured to the frame sections 58 and 62 and to a depending flange 66.

The frame section 62 includes a C-shaped portion 68 of similar cross-section to members 38 and 42. Thus, by using an additional connector member 50, the stabilizer may be attached to the first of the sections 14. The shackle 60 is provided with a suitable aperture 70 to which a towline 72 may be secured.

Thus, the stabilizing unit 12, by virture of its construction as described above, will help to prevent any roll of the boom in the water and help to stabilize the boom as it is being towed.

Figure 9:
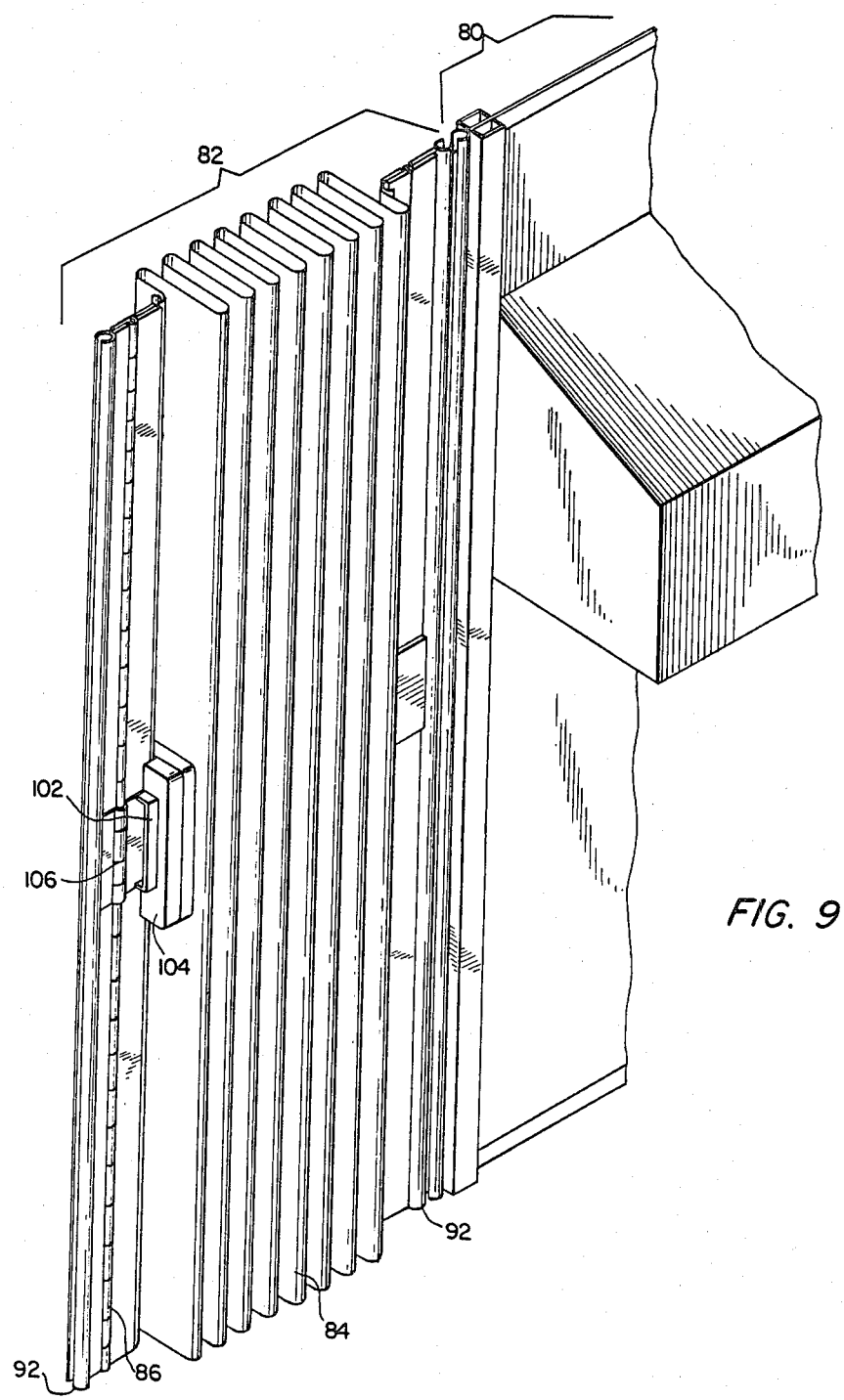
FIG. 9 is a fragmentary perspective view showing an alternative embodiment of the present invention.
Figure 10:
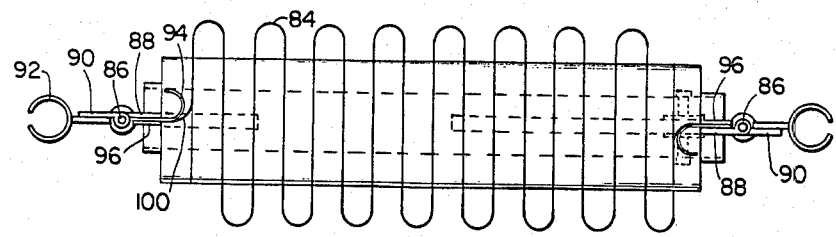
FIG. 10 is a top plan view of the corrugated panel unit of FIG. 9.
Figure 11:
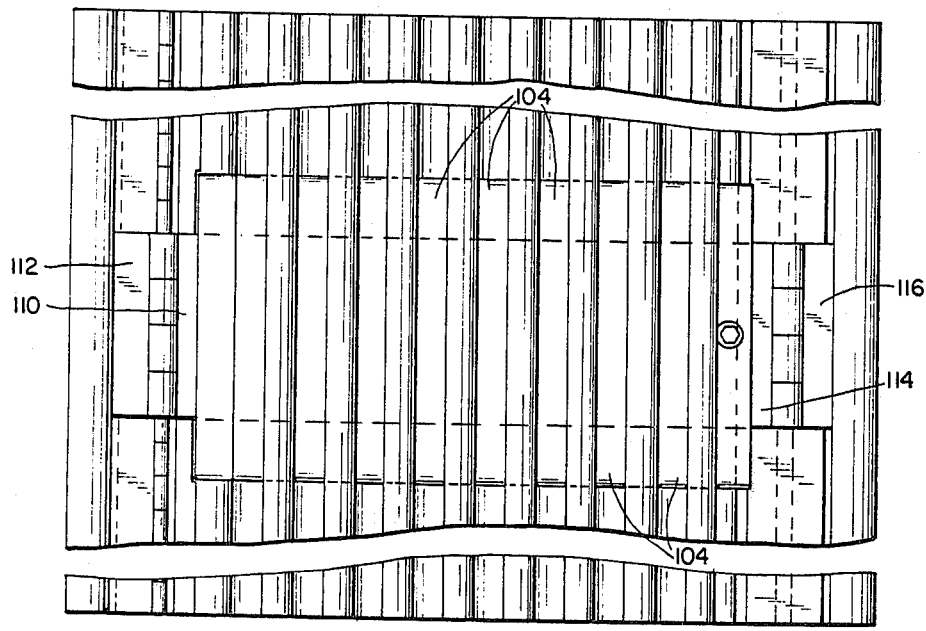
FIG. 11 is a plan view of the corrugated panel unit of FIG. 10, with portions broken away to show indefinite length.
Figure 12:
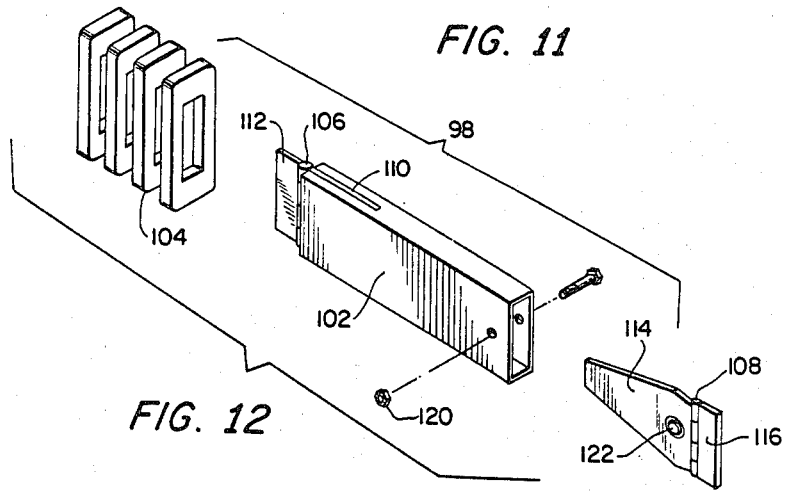
FIG. 12 is an exploded view of the reenforcement elements of FIG. 11.

FIG. 9 shows an alternative configuration of the fire boom structure. Float panel unit 80 is similar in structure to that of the float unit previously described, while corrugated panel unit 82 assumes a somewhat altered configuration from that as previously described. Corrugated panel unit 82 includes corrugated flex panel 84, a pair of piano hinges 86 having flaps 88 and 90 extending in opposite directions therefrom, C-shaped channel members 92 rigidly attached to flaps 90, semi-rigid hooked shaped stress relieving members 94 sandwiched between flaps 88 on one side thereof and support members 96 on the other side thereof and a reenforcement unit generally designated by numeral 98 and as best shown in FIG. 12. Stress relieving members 94 are positioned so that they bear against outwardly extending end portions 100 of flex panel 84. In this manner, when a series of float panel units 80 and corrugated panel units 82 are interlocked and positioned at sea, stress conditions occurring at end portions 100 of flex panel 84 become less concentrated or acute than would be expected without the inclusion of members 94.

The inclusion of hinges 86 allows for greater flexibility of the containment boom both in respect to the towing of the boom arrangement during weather conditions ranging from moderately calm to stormy as well as during the actual positioning of the boom around the area where the accident has occurred.

Approximately midway between the top and bottom of corrugated flex panel 84 and running longitudinally therethrough, is a rectangular slot having dimensions sufficient so as to allow insertion of rectangularly shaped support bar 102 of the reenforcement unit 98. In order to prevent leakage from occurring from one side of flex panel 84 to the other, a series of sealing rings 104 are inserted between adjacent corrugations so as to snugly fit therebetween. Thus, when support bar 102 is positioned longitudinally through flex panel 84, sealing rings 104 will form a tight fit about the periphery of support bar 102 thereby insuring a watertight barrier. Sealing rings 104 are preferably made from neoprene or any other similar resilient oil and water resistant material.

Referring now to FIG. 12, hinges 106 and 108 are attached to support bar 102 at either end thereof. Extending inwardly from the left end of support bar 102 is a longitudinally extending slot into a which is secured hinge plate 110. Extending outwardly in a direction opposite from that of hinge plate 110 is a hinge plate 112. On the right-hand portion of support bar 102 is secured hinge 108 including hinge plates 114 and 116. Hinge plate 114 is inserted into the right-hand portion of support bar 102 and is secured thereto by bolt 118 and nut 120. Bolt 118 passes through spherical bearing 122 so that hinge plate 114 is provided with pivotal movement within support bar 102.

When reenforcement unit 98 is secured within corrugated panel unit 82, lateral and longitudinal loads acting upon flex panel 84 are substantially reduced. The inclusion of reenforcement unit 98 adds structural stability to corrugated panel unit 82 in a manner similar to that of the cable and shock absorbing system of the previously described embodiment. The use of hinge 108, with its associated spherical bearing, allows a degree of vertical as well as horizontal movement between individual float panel units 80 and corrugated panel units 82. Such movement is critical to the performance of the boom arrangement when the boom is in actual usage at sea and is subjected to wave action.

It should be noted that a neoprene sleeve (not shown) may be inserted around hinge plate 114 so as to afford additional protection against oil and water leakage about hinge plate 114. With the exception of rings 104 and the neoprene sleeve around plate 114, all other parts of the boom arrangement described in this embodiment should be made from metal and preferably from stainless steel.

Figure 8:
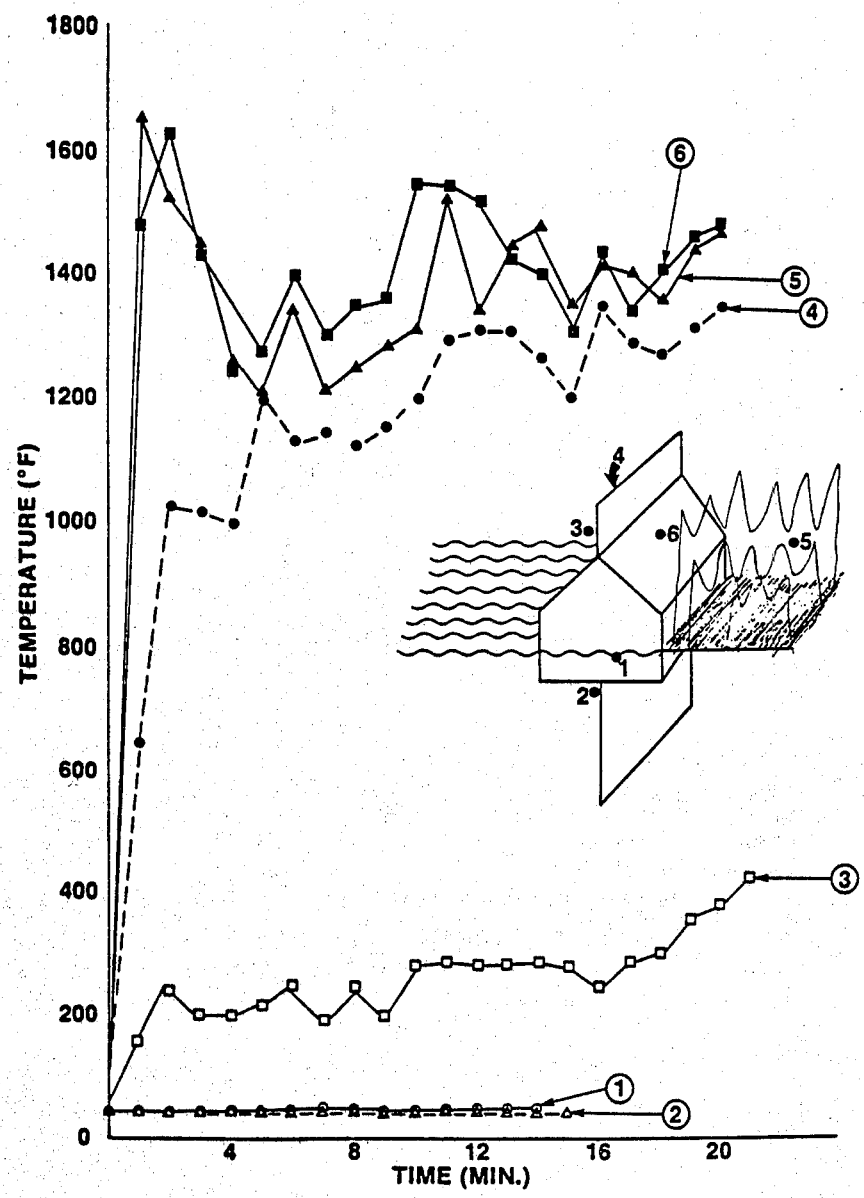
FIG. 8 is a graphical representation of temperature measurements of the containment boom of the present invention during an actual fire.

Referring now to FIG. 8, the inset in the graph shows the location of 6 points at which temperature measurements were taken during an actual fire of petroleum contained by a boom according to the present invention. The water temperature at the beginning of the test was 48° F. (8°, 9° C.) as was the air temperature. The emissions during the burn rose nearly vertically at all times, although occasionally, a very light offshore breeze, not discernible by the observers, caused the plume to deflect up to 45° from the vertical.

It is seen that points 1 and 2, both in the water, remained at ambient temperature throughout substantially the entire test. Point 3, on the opposite side of the freeboard panel from the fire, rose slightly in temperature. Point 4, immediately at the top of the freeboard panel, rose quite rapidly and to a rather high point with time during the burn. Points 5 and 6, both in the direct path of the burn, rose to the highest temperature and most quickly, reaching temperatures as high as about 1635° F. (890° C.) and a high average of about 1500° F. (815° C.). The boom used in the test has a freeboard height of 25 inches which caused a restriction in air supply at the oil/water interface, resulting in combustion occurring principally at a higher elevation. There was no visually apparent failure of any of the components of the boom during the test other than a small leak which occurred at a weld, and the only non-metallic portion of the apparatus, the shock cord 48, was below the water level and thus, likewise was protected from the flame.

Thus, the boom according to the present invention worked extremely well for containing the oil slick and the fire, and after extremely high temperatures was still fit for further use.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What we claim is:

1. A fire resistant spillage containment boom, said boom including a plurality of units capable of being connected together, each of said units comprising a float member, a first panel member extending vertically above said float member, a second panel member extending vertically below said float member, first and second frame members secured to opposite ends of said float member, each of said frame members extending above and below said float member and secured to said first and second panel members, said first frame member including a first channel shaped connecting element, a corrugated panel having vertically disposed corrugations and being substantially coextensive with and secured to said second frame member along a first longitudinal edge thereof, a second channel shaped connecting element attached to the second longitudinal edge of said corrugated panel, shock absorbing means for controlling the flexing of said corrugated panel, a connecting member for connecting the first connecting element of one of said units to the second connecting element of the adjacent unit in said boom, said float member, said panel members, said corrugated panel, said connecting elements, and said connecting member each being formed of a metal capable of withstanding the temperature of a petroleum fire.

2. A containment boom as in claim 1 and including a third channel shaped connecting element secured to said second frame member, a first piano hinge having opposed first and second hinge plates extending therefrom, a fourth channel shaped connecting element secured to said second hinge plate, said first hinge plate secured to one side of said first longitudinal edge of said corrugated panel, a first support member secured to the opposite side of said first longitudinal edge of said corrugated panel, a first generally hook shaped stress relieving member secured between said first hinge plate and said first longitudinal edge of said corrugated panel, a second piano hinge having opposed first and second hinge plates extending therefrom, said first hinge plate of said second hinge secured to said second channel shaped connecting element, said second hinge plate of said second hinge secured to one side of said second longitudinal edge of said corrugated panel, a second support member secured to the opposite side of said second longitudinal edge of said corrugated panel, a second generally hook shaped stress relieving member secured between said second hinge plate of said second hinge and said second longitudinal edge of said corrugated panel, a connecting member for connecting said third channel shaped connecting element with said fourth channel shaped connecting element, said third and fourth channel shaped connecting elements, said first and said second support members, said first and second generally hook shaped stress relieving members, said first and said second piano hinges, said first and said second hinge plates of said first hinge and said first and said second hinge plates of said second hinge all being coextensive.

3. A containment boom as in claim 1 and wherein said shock absorbing means include a horizontally disposed reenforcement unit located approximately midway between the top and bottom of said corrugated panel and extending longitudinally through said vertical corrugations and a series of sealing rings surrounding said reenforcement unit and positioned between adjacent vertical corrugations panel.

4. A containment boom as in claim 3 and wherein said sealing rings are made from neoprene.

5. A containment boom as in claim 3 and wherein said reenforcement unit includes a hollow generally rectangular support bar having first and second ends, a first hinge having first and second hinge plates extending outwardly therefrom, a second hinge having first and second hinge plates extending outwardly therefrom, said first hinge plate of said first hinge secured to said second channel shaped connecting element, said second hinge plate of said first hinge secured within said first end of said support bar, said first hinge plate of said second hinge secured to said second frame member, said second hinge plate of said second hinge secured within said second end of said support bar.

6. A containment boom as in claim 5 and wherein said second hinge plate of said second hinge includes a spherical bearing and said second hinge plate of said second hinge is secured within said second end of said support bar by means of a bolt extending through said second end of said support bar and likewise extending through said spherical bearing and a nut threaded onto said bolt to prevent said second hinge plate of said second hinge from separating from within said second end of said support bar.

7. A containment boom as in claim 1 or 2 and wherein each of said connecting elements comprises a C-shaped channel.

8. A containment boom as in claim 7 and wherein said connecting member comprises a dumbbell shaped member engaging each of said connecting elements.

9. A containment boom as in claim 7 and wherein said float member comprises a hollow chamber and vent means for releasing pressure within said chamber.

10. A containment boom as in claim 1 and wherein said shock absorbing means comprises first and second cables extending diagonally downwardly across each side of said corrugated panel from said float member, and a resilient cable member extending from each of said cables to a lower corner of said corrugated panel.

11. A containment boom as in claim 10 and wherein said resilient cable member comprises a first inextensible portion and a second extensible portion, said extensible portion being positioned entirely below the waterline.

12. A containment boom as in claim 1 or 2 and wherein said boom includes a stabilizing member secured to the leading one of said units.

13. A containment boom as in claim 12 and wherein said stabilizing member comprises a frame section including a third channel shaped connecting element, a horizontally extending float member, a vertically directed panel extending below said float member, and means for connecting a towline to said frame section.

14. A containment boom as in claim 13 and wherein said float chamber is substantially triangular and positioned so that the apex of the triangle is directed toward the towline.

15. A containment boom as in claim 14 and wherein said frame section is substantially triangular and lying in a vertical plane and positioned so that the apex of the triangle is directed toward the towline.

* * * * *